(12) United States Patent
Yang et al.

(10) Patent No.: US 12,504,477 B2
(45) Date of Patent: Dec. 23, 2025

(54) DEVICE AND METHOD FOR DIAGNOSING DAMAGE TO SWITCH IN BATTERY PROTECTION CIRCUIT, AND BATTERY MANAGEMENT DEVICE COMPRISING SAME

(71) Applicant: LG ENERGY SOLUTION, LTD., Seoul (KR)

(72) Inventors: Seung Min Yang, Daejeon (KR); Yun Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 153 days.

(21) Appl. No.: 18/287,259

(22) PCT Filed: Sep. 15, 2022

(86) PCT No.: PCT/KR2022/013773
§ 371 (c)(1),
(2) Date: Oct. 17, 2023

(87) PCT Pub. No.: WO2023/120871
PCT Pub. Date: Jun. 29, 2023

(65) Prior Publication Data
US 2024/0201261 A1  Jun. 20, 2024

(30) Foreign Application Priority Data
Dec. 22, 2021  (KR) .................. 10-2021-0184661

(51) Int. Cl.
*G01R 31/333* (2006.01)
*G01R 19/165* (2006.01)
(Continued)

(52) U.S. Cl.
CPC ... *G01R 31/3333* (2013.01); *G01R 19/16566* (2013.01); *G01R 31/3835* (2019.01); *H02J 7/00302* (2020.01); *H02J 7/00306* (2020.01)

(58) Field of Classification Search
CPC ........................ G01R 31/3333; G01R 31/3835
See application file for complete search history.

(56) References Cited

U.S. PATENT DOCUMENTS 9,876,371 B2 * 1/2018 Yang .................. H01M 10/48
10,199,843 B2 * 2/2019 Schimel ................ H02J 7/0031
(Continued)

FOREIGN PATENT DOCUMENTS

| JP | 11-178224 A | 7/1999 |
|---|---|---|
| JP | 2001-57740 A | 2/2001 |

(Continued)

OTHER PUBLICATIONS

Japanese Office Action for Japanese Application No. 2023-563872, dated Aug. 19, 2024, with English translation.
(Continued)

*Primary Examiner* — Walter L Lindsay, Jr.
*Assistant Examiner* — Milton Gonzalez
(74) *Attorney, Agent, or Firm* — Birch, Stewart, Kolasch & Birch, LLP

(57) ABSTRACT

An apparatus and method for diagnosing damage of a switch in a battery protection circuit include a battery protection circuit including a first switch and a second switch connected to a battery pack and a switch damage diagnosing device for measuring in the battery protection circuit and for diagnosing whether any one of the first switch and the second switch is damaged. The source terminal of the first switch and the source terminal of the second switch can be connected to a common source, which can diagnose whether (Continued)

or not the switch is damaged only by measuring the voltage at a certain point without measuring a current.

15 Claims, 6 Drawing Sheets

(51) Int. Cl.
  *G01R 31/3835* (2019.01)
  *H02J 7/00* (2006.01)

(56) References Cited

U.S. PATENT DOCUMENTS

| | | | |
|---|---|---|---|
| 11,506,715 | B2 | 11/2022 | Song |
| 11,513,139 | B2 | 11/2022 | Ock et al. |
| 2012/0212159 | A1 | 8/2012 | Kitamoto |
| 2014/0301005 | A1 | 10/2014 | Genova et al. |
| 2015/0303789 | A1 | 10/2015 | Feng et al. |
| 2016/0241057 | A1* | 8/2016 | Yang ............... H02J 9/062 |
| 2017/0040809 | A1 | 2/2017 | Shiraishi et al. |
| 2018/0026456 | A1* | 1/2018 | Kang ............... G01R 31/371 320/134 |
| 2018/0123584 | A1 | 5/2018 | Morimoto |
| 2019/0280341 | A1 | 9/2019 | Li |
| 2020/0235591 | A1 | 7/2020 | Kawasaki et al. |
| 2021/0041502 | A1* | 2/2021 | Song ............... H02J 7/0013 |
| 2021/0242690 | A1 | 8/2021 | Okamoto et al. |
| 2022/0260637 | A1 | 8/2022 | Park |

FOREIGN PATENT DOCUMENTS

| | | | |
|---|---|---|---|
| JP | 2004-103499 | A | 4/2004 |
| JP | 2012-100438 | A | 5/2012 |
| JP | 2012-188101 | A | 10/2012 |
| JP | 2015-109741 | A | 6/2015 |
| JP | 2015-208211 | A | 11/2015 |
| JP | 2018-72155 | A | 5/2018 |
| JP | 2019-162020 | A | 9/2019 |
| JP | 6614388 | B1 | 12/2019 |
| JP | 2020-108219 | A | 7/2020 |
| KR | 10-0873016 | B1 | 12/2008 |
| KR | 10-1344251 | B1 | 12/2013 |
| KR | 10-2018-0049456 | A | 5/2018 |
| WO | WO 2008/035523 | A1 | 3/2008 |

OTHER PUBLICATIONS

International Search Report (PCT/ISA/210) issued in PCT/KR2022/013773, dated Jan. 5, 2023.
Extended European Search Report for European Application No. 22911510.0, dated Sep. 20, 2024.

* cited by examiner

[Figure 1]
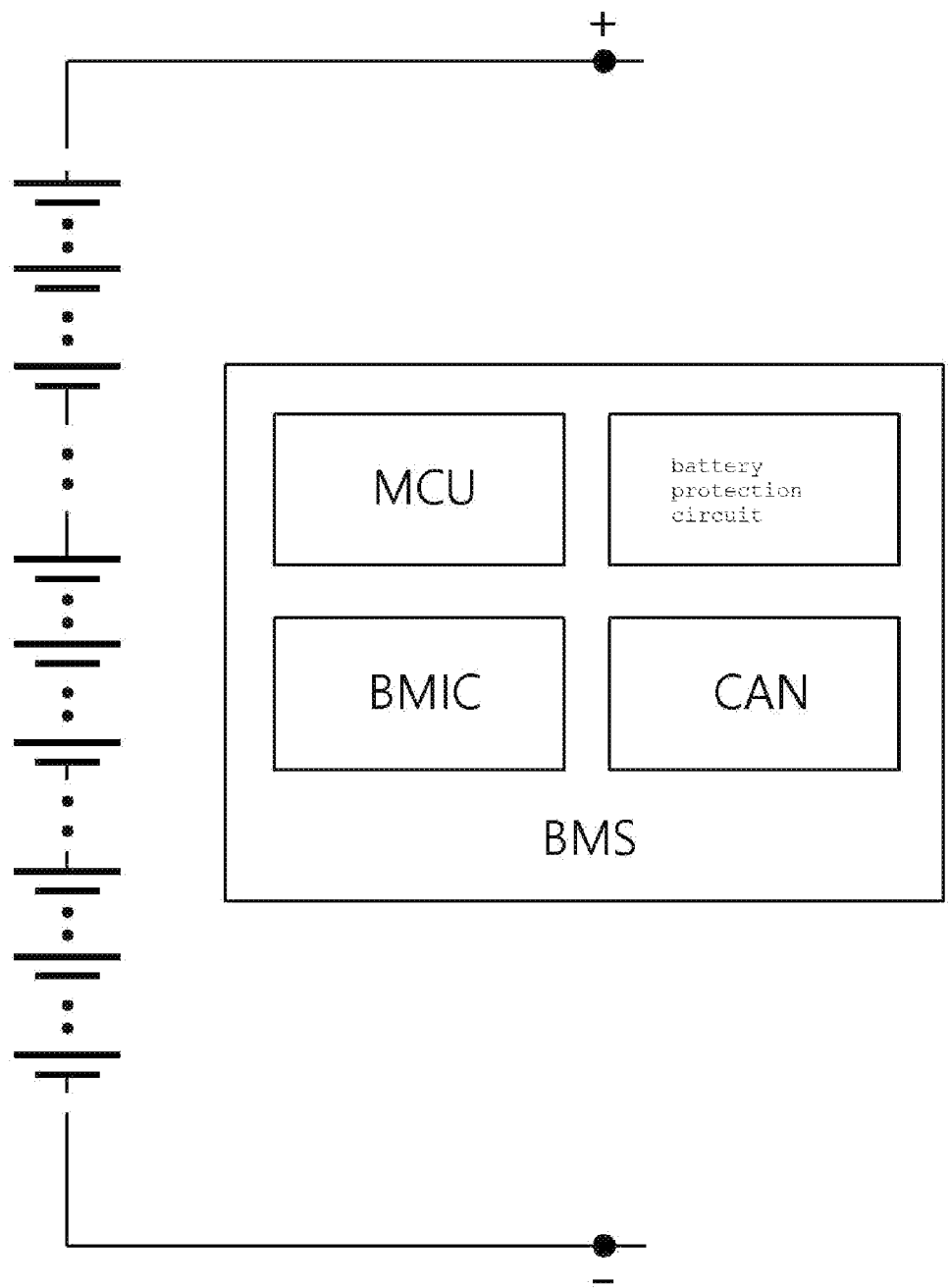

[Figure 2]
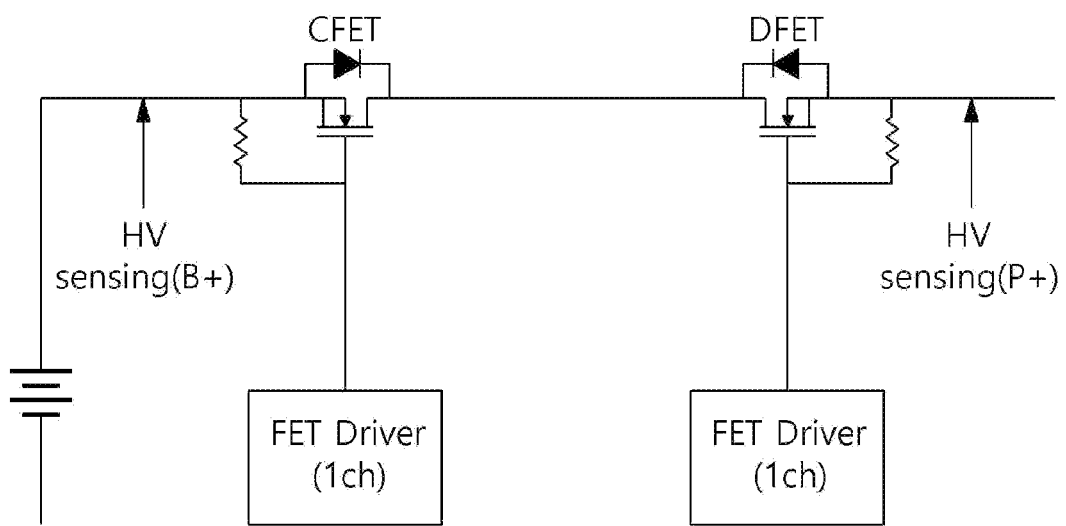

[Figure 3]
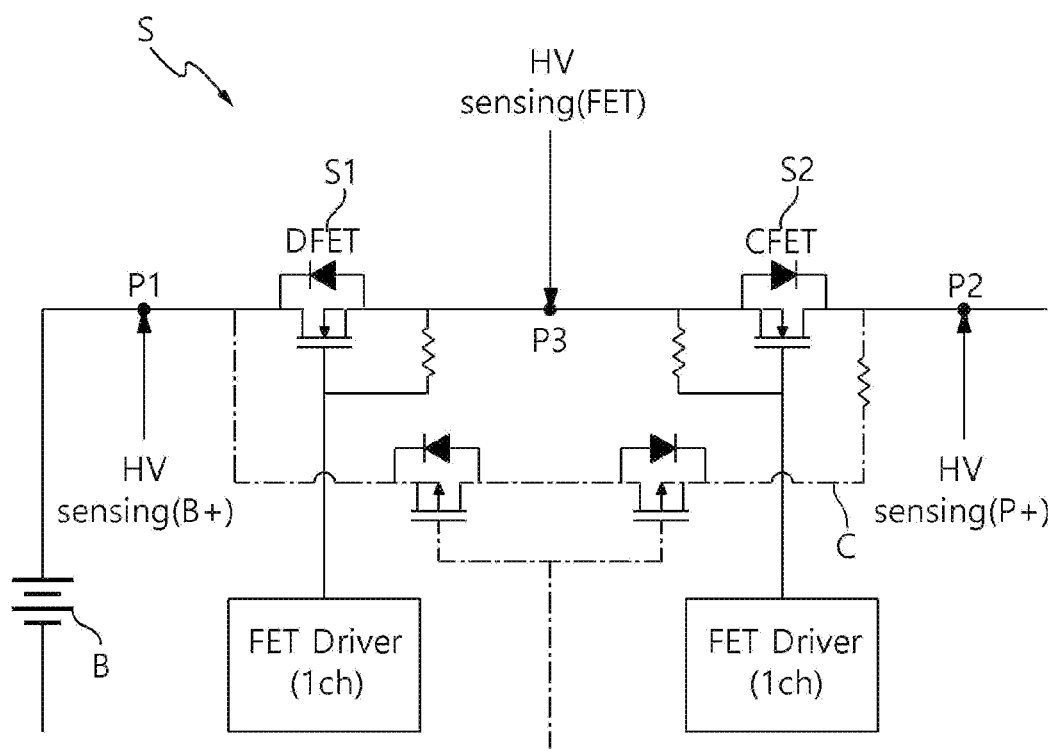

[Figure 4]
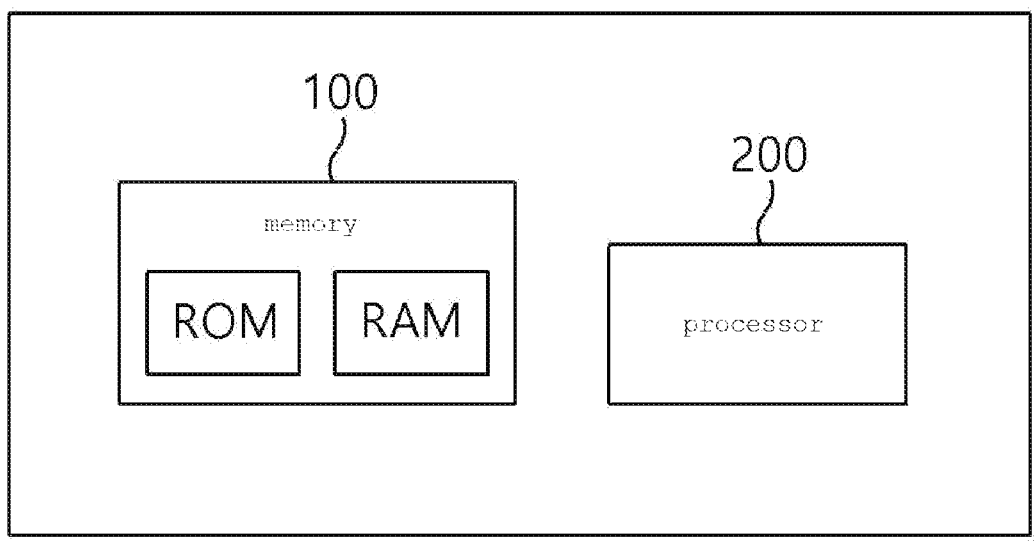

[Figure 5]
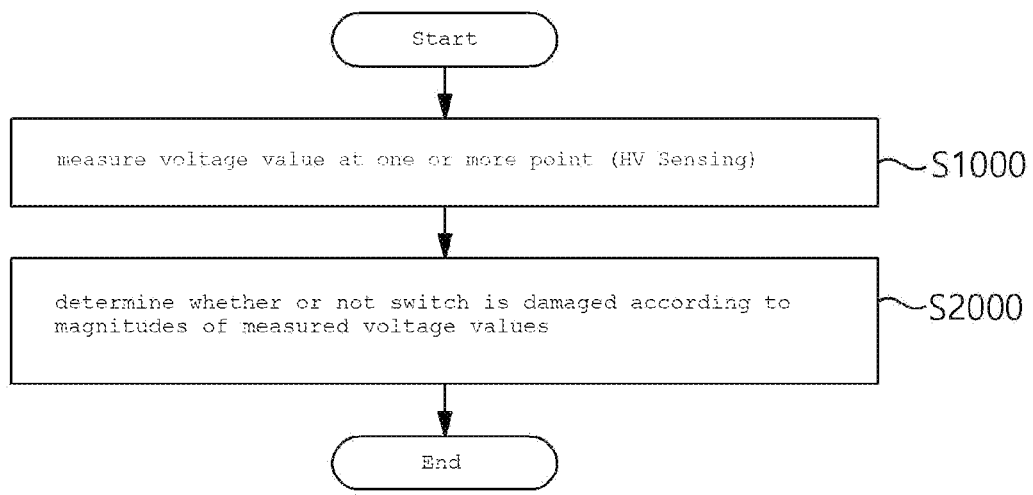

[Figure 6]

| DFET(S1) | CFET(S2) | $V_{B+}$ | $V_{FET}$ | $V_{P+}$ |
|---|---|---|---|---|
| Normal (open) | Normal (open) | High | Low | High |
| Damage (short) | Normal (open) | High | High | High |
| Normal (open) | Damage (short) | High | High | High |
| Damage (short) | Damage (short) | High | High | High |

DEVICE AND METHOD FOR DIAGNOSING DAMAGE TO SWITCH IN BATTERY PROTECTION CIRCUIT, AND BATTERY MANAGEMENT DEVICE COMPRISING SAME

TECHNICAL FIELD

This application claims priority to and the benefit of Korean Patent Application No. 10-2021-0184661 filed in the Korean Intellectual Property Office on Dec. 22, 2021, the entire contents of which are incorporated herein by reference.

The present invention relates to an apparatus and a method for diagnosing damage of a switch in a battery protection circuit and a battery management apparatus including the same, and more particularly, to an apparatus and a method for diagnosing damage of a switch in a battery protection circuit and a battery management apparatus including the same for preventing overcharging or overdischarging of a battery pack.

BACKGROUND ART

Batteries are being applied to various industrial fields such as mobile application devices, automobiles, robots, and energy storage devices as a countermeasure against environmental regulations and high oil price issues.

Generally, a battery pack is provided as a rechargeable secondary battery, but such a battery is ignited when overcharged or deteriorated when overdischarged, resulting in a reduced lifespan.

Accordingly, a conventional battery management system provides a battery protection circuit that blocks a charging or discharging circuit when overcharging or overdischarging occurs in order to protect a battery pack.

A battery protection circuit blocks a charge/discharge circuit by controlling the operation of a switch connected to one or more battery packs.

In general, a switch applied to a battery protection circuit is provided as a power transistor whose drain terminal is grounded.

However, the conventional battery protection circuit has a downside that accuracy of a measured value when measuring a voltage of a battery pack for controlling the switch operation may be lowered due to characteristics of a parasitic diode generated inside a power transistor, thereby reducing reliability of the charge/discharge control operation.

Accordingly, conventionally, it is confirmed whether a switch is damaged by measuring a voltage value and a current value at a specific point in the battery protection circuit.

However, since the current value can be measured only in a state in which the battery pack is being charged or discharged, it is difficult to prevent damage of the battery pack from application of an abnormal current.

DETAILED DESCRIPTION

Technical Problem

In order to solve the problem, an object of the present invention is to provide a battery management apparatus with high stability, high precision, and high reliability.

In order to solve the problem, another object of the present invention is to provide a method for SWITCH with high stability, high precision, and high reliability.

In order to solve the problem, the other object of the present invention is to provide an apparatus for diagnosing damage of a switch with high stability, high precision, and high reliability.

Technical Solution

In order to achieve the objective of the present disclosure, a battery management apparatus may comprise a battery protection circuit including a first switch and a second switch connected to a battery pack and a switch damage diagnosing device configured to measure a voltage at one or more points in the battery protection circuit and to diagnose whether any one of the first switch and the second switch is damaged, wherein the source terminal of the first switch and the source terminal of the second switch are connected to a common source.

The first switch may be a discharge control transistor configured to control a discharge circuit when discharging the battery pack and the second switch may be a charge control transistor configured to control a charge circuit when charging the battery pack.

A drain terminal of the first switch in the battery protection circuit may be connected to a positive electrode of the battery pack and a drain terminal of the second switch is connected to a load.

The battery protection circuit may further include a voltage applying circuit, wherein a first end of the voltage applying circuit is connected to a first point between the battery pack and the drain terminal of the first switch, and a second end of the voltage applying circuit is connected to a second point between the drain terminal of the second switch and the load, and the voltage applying circuit may be configured to bypass the first switch and the second switch to apply a voltage of the battery pack to the second point.

The voltage applying circuit may comprise a P-channel switching circuit.

The one or more points in the battery protection circuit may include a first point between the battery pack and the drain terminal of the first switch, a second point between the drain terminal of the second switch and the load, and a third point at which a source terminal of the first switch and a source terminal of the second switch are connected to a common source.

The switch damage diagnosing device may be configured to determine that the first switch and the second switch are normally operating, when a voltage at the third point is less than or equal to a threshold value.

The switch damage diagnosing device may be configured to determine that the first switch and the second switch are normally operating, when a voltage at the first point and a voltage at the second point are greater than or equal to the threshold value and the voltage the third point is less than or equal to the threshold value.

In addition, the switch damage diagnosing device may be configured to determine that any one of the first switch and the second switch is damaged, when the voltages at the first point, the second point and to the third point are greater than or equal to the threshold value.

According to another embodiment of the present disclosure, a method for diagnosing damage of a switch in a battery protection circuit including a first switch and a second switch connected to a battery pack, the method may comprise measuring a voltage at one or more points in the battery protection circuit and comparing the voltage with a threshold value to diagnose whether any one of the first switch and the second switch is damaged, wherein a source terminal of the first switch and a source terminal of the second switch are connected to a common source.

The first switch may be a discharge control transistor configured to control a discharge circuit when discharging the battery pack and the second switch may be a charge control transistor configured to control a charge circuit when charging the battery pack.

The battery protection circuit may further include a voltage applying circuit, wherein a first end of the voltage applying circuit is connected to a first point between the battery pack and a drain terminal of the first switch, and a second end of the voltage applying circuit is connected to a second point between a drain terminal of the second switch and the load, and the voltage applying circuit may bypass the first switch and the second switch to apply a voltage of the battery pack to the second point.

The voltage applying circuit may comprise a P-channel switching circuit.

The measuring the voltage at one or more points in the battery protection circuit may include measuring a voltage at a first point between the battery pack and the drain terminal of the first switch; measuring a voltage at a second point between the drain terminal of the second switch and the load; and measuring a voltage at a third point at which the source terminal of the first switch and the source terminal of the second switch are connected to a the common source.

The comparing the voltage with the threshold value to diagnose whether any one of the first switch and the second switch is damaged may include determining that the first switch and the second switch are normally operating when the voltage at the third point is less than or equal to a the threshold value.

The comparing the voltage with the threshold value, to diagnose whether any one of the first switch and the second switch is damaged may include determining that the first switch and the second switch are normally operating when the voltage at the first point and the voltage at the second point are greater than or equal to the threshold value and the voltage at the third point is less than or equal to the threshold value.

The comparing the voltage with the threshold value to diagnose whether any one of the first switch and the second switch is damaged may include determining that any one of the first switch and the second switch is damaged, when the voltages at the first point, the second point and the third point are greater than or equal to the threshold value.

The first switch and the second switch may be high side type power transistors positioned closer to the battery pack relative to the load.

According to another embodiment of the present disclosure, an apparatus for diagnosing damage of a switch in a battery protection circuit including a first switch and a second switch connected to a battery pack, the apparatus may comprise at least one processor; and a memory configured to store at least one instruction executed by the at least one processor, wherein the at least one instruction includes an instruction to measure a voltage at one or more points in the battery protection circuit; and an instruction to compare the voltage with a threshold value to diagnose whether any one of the first switch and the second switch is damaged, and wherein a source terminal of the first switch and a source terminal of the second switch are connected to a common source.

The first switch may be a discharge control transistor configured to control a discharge circuit when discharging the battery pack, and the second switch may be a charge control transistor configured to control a charge circuit when charging the battery pack.

The battery protection circuit may further include a voltage applying circuit, wherein a first end of the voltage applying circuit is connected to a first point between the battery pack and a drain terminal of the first switch, and a second end of the voltage applying circuit is connected to a second point between a drain terminal of the second switch and the load, and the voltage applying circuit may be configured to bypass the first switch and the second switch to apply a voltage of the battery pack to the second point.

The voltage applying circuit may comprise a P-channel switching circuit.

The instruction to measure the voltage at the one or more points in the battery protection circuit may include an instruction to measure a voltage at a first point between the battery pack and the drain terminal of the first switch; an instruction to measure a voltage at a second point between the drain terminal of the second switch and the load; and an instruction to measure a voltage at a third point at which the source terminal of the first switch and the source terminal of the second switch are connected to the common source.

The instruction to compare the voltage with the threshold value to diagnose whether any one of the first switch and the second switch is damaged may include an instruction to determine that the first switch and the second switch are normally operating, when the voltage at the first point and the voltage at the second point are greater than or equal to the threshold value and the voltage at the third point is less than or equal to the threshold value.

The instruction to compare the voltage with the threshold value to diagnose whether any one of the first switch and the second switch is damaged may include an instruction to determine that the first switch and the second switch are normally operating, when the voltage at the third point is less than or equal to the threshold value.

The instruction to compare the voltage with the threshold value to diagnose whether any one of the first switch and the second switch is damaged may include an instruction to determine that any one of the first switch and the second switch is damaged, when the voltages at the first point, the second point and the third point are greater than or equal to the threshold value.

The first switch and the second switch may be high side type power transistors positioned closer to the battery pack relative to the load.

Advantageous Effects

According to embodiments of the present disclosure, an apparatus and method for diagnosing damage of a switch in a battery protection circuit according to embodiments of the present invention, and a battery management apparatus including the same include a battery protection circuit including a first switch and a second switch connected to a battery pack and a switch damage diagnosing device configured to measure one or more voltage at one or more point in the battery protection circuit and to diagnose whether any one of the first switch and the second switch is damaged, wherein the source terminal of the first switch and the source terminal of the second switch are connected to a common source, which can diagnose whether or not the switch is damaged only by measuring a voltage at one or more point without measuring a current, and thus, a battery pack can be charged and discharged after checking whether the switch is damaged and the battery pack can be protected from abnormal current generation due to overcharging or overdischarging, thereby providing a high-stability, high-accuracy and high-reliability apparatus and method for diagnosing damage of a switch in a battery protection circuit, and a battery management apparatus including the same.

BRIEF DESCRIPTION OF THE DRAWINGS

FIG. 1 shows a structure of a battery system to which the present invention may be applied.

FIG. 2 is a part of a battery protection circuit diagram in a typical battery management apparatus.

FIG. 3 is a part of a battery protection circuit diagram in a battery management apparatus according to embodiments of the present invention.

FIG. 4 is a block diagram of a switch damage diagnosing apparatus according to embodiments of the present invention.

FIG. 5 is a flowchart illustrating a method for diagnosing damage of a switch according to embodiments of the present invention.

FIG. 6 is a table summarizing switch states according to voltage measurement values at first to third points in a battery protection circuit according to an experimental example of the present invention.

| | |
|---|---|
| B: battery pack | |
| C: voltage applying circuit | |
| S: switch | S1: first switch (DFET) |
| S2: second switch (CFET) | P1: first point |
| P2 : second point | P3: third point |
| 100: memory | 200: processor |

BEST MODE

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

Terms used in the present application are used only to describe specific embodiments, and are not intended to limit the present invention. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Hereinafter, exemplary embodiments of the present invention will be described in detail with reference to the accompanying drawings.

FIG. 1 shows a structure of a battery system to which the present invention may be applied.

In FIG. 1, a battery pack or battery module may include a plurality of battery cells connected in series. The battery pack or module may be connected to a load through a positive terminal and a negative terminal to perform charging or discharging. The most commonly used battery cell is a lithium-ion (Li-Ion) battery cell.

A battery management system (BMS) may be installed in a battery module or battery pack.

The BMS may monitor a current, a voltage and a temperature of each battery pack to be managed, calculate a state of charge (SOC) of the battery based on monitoring results to control charging and discharging. Here, the State of Charge (SOC) refers to a current state of charge of a battery, represented in percent points [%], and the State of Health (SOH) may be a current condition of a battery comprated to its ideal conditions, represented in percent points [%].

The BMS may monitor battery cells, read cell voltages, and transmit them to other systems connected to the battery.

The BMS also balances charges of the battery cells equally to prolong a life of the battery system.

The BMS may include various components such as a fuse, a current sensing element, a thermistor, a switch, and a balancer to perform such operations. In most cases, a micro controller unit (MCU) or a battery monitoring integrated chip (BMIC) for interworking and controlling these components is additionally included in the BMS.

Here, the BMIC may be located inside the BMS and may be an integrated circuit (IC) type component that measures information such as voltage, temperature, and current of a battery cell/module. According to an embodiment, the battery management system (BMS) may include a battery protection circuit for blocking a charge/discharge circuit.

Furthermore, the battery management system monitors battery cells, reads cell voltages and passes them on to other systems connected to the battery. For this, the BMS includes a communication module for communicating with other systems in a device including the battery system. The communication module of the BMS can communicate with other systems in the device using CAN (Controller Area Network). Here, components, modules or systems in the BMS are connected to each other through a CAN bus.

Controller Area Network is a communication standard designed for microcontrollers or devices to communicate with each other in a vehicle without a host computer. According to an embodiment, the CAN communication is a non-host bus type message-based network protocol mainly used for communication between controllers.

FIG. 2 is a part of a battery protection circuit diagram in a typical battery management apparatus.

Referring to FIG. 2, a battery protection circuit in a battery management apparatus may be a circuit for blocking a charge/discharge circuit.

The battery protection circuit comprises one or more battery packs and a switch, and may block the charge/discharge circuit by controlling the operation of the switch when an abnormal current occurs in the circuit due to external environments. Accordingly, the battery protection circuit may prevent overcharging or overdischarging of the battery pack due to an abnormal current.

To describe the battery protection circuit in more detail for each component, the switch may be provided as power transistors (Power FETs) that perform charge control and discharge control.

A switch in a typical battery protection circuit may include a charge control transistor (CFET) and a discharge control transistor (DFET).

In a typical charge control transistor (CFET), the source terminal is connected to an anode of a battery pack, and the drain terminal of the conventional charge control transistor is connected to the drain terminal of the discharge control transistor (DFET). In other words, the typical charge control transistor (CFET) and discharge control transistor (DFET) are provided in a form of a common drain in which the drain terminals are commonly grounded.

In addition, the source terminal of the typical discharge control transistor (DFET) is connected to an external input/output terminal, e.g., a load.

The operation of the switch may be controlled by high voltage sensing (HV sensing) measurements measured at a first point and a second point in the battery protection circuit.

Here, the voltage value measured at the first point may be a voltage value ($V_{B+}$) measured at a point between the connected battery pack and the charge control transistor (CFET), and the voltage value measured at the second point may be a voltage value ($V_{P+}$) measured at a point between the connected discharge control transistor (DFET) and the external input and output terminals.

However, as to measuring voltages of the battery pack for controlling the switch operations in the typical battery protection circuit, the accuracy of the measured value is lowered due to characteristics of a parasitic diode generated inside the power transistors, so the reliability of charge/discharge control operations have decreased.

Accordingly, for precise charge/discharge control operations of the switch in the general battery protection circuit, it is diagnosed if the first switch and the second switch was damaged by measuring currents as well when measuring voltages at the first point and the second point.

However, since the typical device for diagnosing switch damage can measure current only in a state in which the battery pack is being charged or discharged, it is difficult to prevent damage to the battery pack when an abnormal current is applied.

Therefore, in the present invention, a high-stability, high-accuracy and high-reliability switch damage diagnosing apparatus and a method capable of diagnosing damage to a switch only by measuring voltages in a battery protection circuit even in a state where charging and discharging current does not flow, and a battery management apparatus including the same will be described.

FIG. 3 is a part of a battery protection circuit diagram in a battery management apparatus according to embodiments of the present invention.

Referring to FIG. 3, a battery management system (BMS) may include a battery protection circuit and a switch damage diagnosing device.

In more detail for each configuration, the battery protection circuit may be configured by connecting one or more battery packs B and a switch S. Accordingly, in the battery protection circuit, flows of charge/discharge current of the battery pack B may be controlled by the operation of the switch S.

Here, the switch S may include a first switch S1 and a second switch S2.

In addition, the first switch S1 and the second switch S may be provided as high-side type power transistors. In other words, the first switch S1 and the second switch S2 may be located close to the battery pack side compared to the load.

In more detail according to embodiments, the first switch S1 may be a discharge control transistor (DFET) that controls battery discharge.

The drain terminal of the first switch S1 may be connected to the positive electrode of the battery pack, and the source terminal may be connected to the source terminal of the second switch S2 to be described later.

In addition, the second switch S2 may be a charge control transistor (CFET) for controlling battery charge.

More specifically, the drain terminal of the second switch S2 may be connected to an external input/output terminal, and as described above, the source terminal of the second switch S2 may be connected to the source terminal of the first switch S1.

In other words, the battery protection circuit in the battery management apparatus according to embodiments of the present invention may be provided by sequentially connecting one or more battery packs, the first switch S1 and the second switch S2. In addition, the switch S may be provided in a form in which the source terminal of the first switch S1 and the source terminal of the second switch S2 are connected to a common source.

In addition, the battery protection circuit may further include a voltage applying circuit C connecting the first point P1 and the second point P2. Here, the voltage value measured at the first point P1 may be a voltage value ($V_{B+}$) measured at any one point between the battery pack B and the first switch S1 and the voltage value measured at the second point P2 may be a voltage value ($V_{P+}$) measured at any one point between the second switch S2 and the load.

In addition, the voltage applying circuit C may be a basic switching circuit composed of a P-channel and not having a separate driving drive.

The voltage applying circuit (C) may be a circuit for applying a battery voltage to the second switch (S2) when diagnosing the second switch (S2) by a switch damage diagnosing device to be described later. In other words, the voltage applying circuit C may be a circuit that transfers a battery voltage from the first point P1 to the second point P2 in order to diagnose whether the second switch S2 is damaged. A method for diagnosing whether the second switch S2 is damaged using the voltage applying circuit C will be described in more detail with reference to FIGS. 5 and 6 below.

The switch damage diagnosing device may diagnose whether a switch is damaged by measuring voltage values (High Voltage Sensing; HV Sensing) at first to third points P1 to P3 in the battery protection circuit.

More specifically, the device for diagnosing damage to the switch may measure voltage values (HV Sensing) at the first to third points P1 to P3.

Here, the voltage value measured at the first point P1 may be the voltage value ($V_{B+}$) measured at any one point between the battery pack B and the first switch S1 and the voltage value measured at the second point P2 may be a voltage value ($V_{P+}$) measured at any one point between the second switch S2 and the load.

Furthermore, the voltage value measured at the third point P3 may be a voltage value ($V_{FET}$) measured at any one point between the connected first switch S1 and second switch S2.

Thereafter, the switch damage diagnosing device may diagnose whether at least one of the first switch S1 and the second switch S2 is damaged based on the at least one voltage value measured.

According to an embodiment, the switch damage diagnosing device is configured such that, in the instance that the voltage value $V_{B+}$ measured at the first point P1 and the voltage value $V_{P+}$ measured at the second point P2 are greater than or equal to a threshold value and the voltage value $V_{FET}$ at the third point P3 is less than or equal to the threshold value, the switch damage diagnosing device may determine that the first switch S1 and the second switch S2 operate normally.

According to another embodiment, the switch damage diagnosing device may determine that any one of S1 and the second switch S2 is damaged in the instance that the voltage values ($V_{B+}$, $V_{P+}$, $V_{FET}$) measured at the first point to the third point (P1 to P3) are greater than or equal to a threshold value.

Therefore, the switch damage diagnosing device in a battery management apparatus according to embodiments of the present invention can prevent damage to a battery pack from a parasitic diode by diagnosing whether a switch in a battery protection circuit is damaged without any separate current measurement.

In FIG. 4 below, the switch damage diagnosing device will be described in more detail for each hardware configuration.

FIG. 4 is a block diagram of a switch damage diagnosing apparatus according to embodiments of the present invention.

Referring to FIG. 4, an apparatus (or device) for diagnosing switch damage to a switch may be provided in a form of a micro controller unit (MCU) within a battery management system (BMS).

In more detail for each component, the switch damage diagnosing apparatus may include a memory 100 and a processor 200.

In more detail according to embodiments, the memory 100 is a space for storing at least one piece of data and may be composed of at least one of a volatile storage medium and a non-volatile storage medium. For example, the memory 100 may include at least one of a read only memory (ROM) and a random access memory (RAM).

Here, the memory 100 may include at least one instruction executed by the processor 200 to diagnose damage to a switch in the battery protection circuit.

According to an embodiment, the at least one instruction may include an instruction to measure one or more voltage at one or more point in the battery protection circuit and an instruction to compare the one or more voltage value with a threshold value to diagnose whether any one of the first switch and the second switch is damaged.

The processor 200 may mean a central processing unit (CPU), a graphics processing unit (GPU), or a dedicated processor on which methods according to embodiments of the present invention are performed.

As described above, the processor 200 may repeatedly execute at least one program command stored in the memory 100.

A battery management apparatus including a battery protection circuit and a device for diagnosing damage to a switch according to embodiments of the present invention has been described above.

Hereinafter, a method for diagnosing damage of a switch of the apparatus for diagnosing switch damage using the battery protection circuit will be described.

FIG. 5 is a flowchart illustrating a method for diagnosing damage of a switch according to embodiments of the present invention.

Referring to FIG. 5, the processor 200 may measure (HV Sensing) a voltage value at one or more point in the battery protection circuit (S1000).

According to an embodiment, the processor 200 may measure voltage values $V_{B+}$, $V_{P+}$, and $V_{FET}$ at the first to third points P1 to P3.

Thereafter, the processor 200 may determine whether or not a switch in the battery protection circuit is damaged according to magnitudes of the measured voltage values $V_{B+}$, $V_{P+}$, and $V_{FET}$ (S2000).

According to one embodiment, the measured voltage values $V_{B+}$, $V_{P+}$, and $V_{FET}$ may be individually compared with a threshold value, and in case that any one of the voltage values $V_{B+}$, $V_{P+}$, and $V_{FET}$ is less (Low) than the threshold value, the processor 200 may determine that both the first switch S1 and the second switch S2 operate normally.

According to another embodiment, the measured voltage values $V_{B+}$, $V_{P+}$, and $V_{FET}$ are individually compared with the threshold value, and in case that the voltage values $V_{B+}$, $V_{P+}$, and $V_{FET}$ are higher (High) than the threshold value, the processor 200 may determine that damage has occurred to at least one of the first switch S1 and the second switch S2.

In FIG. 6 below, an experimental example for determining states of the first switch to the third switch according to the measured voltage values at the first to third points will be described in more detail.

FIG. 6 is a table summarizing switch states according to voltage measurement values at first to third points in a battery protection circuit according to an experimental example of the present invention.

Referring to FIG. 6, the apparatus for diagnosing switch damage may measure voltages $V_{B+}$, $V_{P+}$, and $V_{FET}$ at first, second, and third points and diagnose a switch damage in order to prevent a control error caused by a parasitic diode of a switch in a power transistor.

According to an experimental example, as a result of measuring the voltage values at the first to third points P1-P3 according to whether the first switch S1 and the second switch S2 are damaged or not, when the first switch S1 and the second switch S2 blocks (opens) the circuit in a normal state, the voltage value $V_{B+}$ at the first point P1 and the voltage value $V_{P+}$ at the second point P2 were measured as higher (High) than a specific threshold voltage value, and the voltage value $V_{FET}$ at the third point P3 was measured as lower (Low) than the specific threshold voltage.

Meanwhile, according to another experimental example, when the first switch S1 is damaged and shorted and the second switch S2 operates normally and opens the circuit, the voltage values $V_{B+}$, $V_{P+}$, and $V_{FET}$ at first to third points P1-P3 were measured higher (High) than a certain threshold voltage value.

In addition, according to another embodiment, when the first switch S1 is disconnected (open) in a normal state and the second switch S2 is damaged and shorted, the voltage values $V_{B+}$, $V_{P+}$, and $V_{FET}$ at the first to third points P1-P3) were measured higher (High) than a certain threshold voltage value.

Meanwhile, according to another embodiment, when both the discharge control transistor (DFET) and the charge control transistor (CFET) are damaged and shorted, the voltage values $V_{B+}$, $V_{P+}$, and $V_{FET}$ at the first to third points P1-P3) were measured higher (High) than a certain threshold voltage value.

In other words, in the switch damage diagnosing apparatus according to embodiments of the present invention, It can be determined that the first switch S1 and the second switch S2 operate normally only when the voltage value $V_{FET}$ measured at the third point is less (Low) than the threshold voltage.

Accordingly, without being limited to what has been described above, the switch damage diagnosing apparatus according to embodiments of the present invention may measure only the voltage value $V_{FET}$ at the third point, compare it with a threshold voltage, and determine whether the first switch (S) and the second switch S2 are damaged or not.

In summary, in the prior art, in order to diagnose damage to a switch in a battery protection circuit, charging or discharging of a battery pack was necessarily performed. However, the battery protection circuit according to embodiments of the present invention can diagnose whether or not the switch is damaged only by measuring a voltage at at least one point, and thus, a battery pack can be charged and discharged after checking whether the switch is damaged and the battery pack can be protected from abnormal current generation due to overcharging or overdischarging.

An apparatus and a method for diagnosing a switch damage in a battery protection circuit according to embodiments of the present invention and a battery management apparatus including the same have been described above.

An apparatus and a method for diagnosing a switch damage in a battery protection circuit according to embodiments of the present invention, and a battery management apparatus including the same include a battery protection circuit including a first switch and a second switch connected to a battery pack and a switch damage diagnosing device configured to measure one or more voltage at one or more point in the battery protection circuit and to diagnose whether any one of the first switch and the second switch is damaged, wherein the source terminal of the first switch and the source terminal of the second switch are connected to a common source, which can diagnose whether or not the switch is damaged only by measuring a voltage at a certain point without measuring a current, and thus, a battery pack can be charged and discharged after checking whether the switch is damaged and the battery pack can be protected from abnormal current generation due to overcharging or overdischarging, thereby providing a high-stability, high-accuracy and high-reliability apparatus and method for diagnosing switch damage in a battery protection circuit, and a battery management apparatus including the same.

The operations of the method according to the embodiments of the present invention may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

In addition, the computer-readable recording medium may include a hardware device, such as a ROM, a RAM, and a flash memory, specially configured to store and execute program instructions. The program instructions may include not only machine language codes such as those generated by a compiler, but also high-level language codes that can be executed by a computer by using an interpreter or the like.

Although some aspects of the invention have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit. In some embodiments, one or more of the most important method steps may be performed by such an apparatus.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. A battery management apparatus comprising:
a battery protection circuit including a first switch and a second switch connected to a battery pack; and
a switch damage diagnosing device configured to measure a voltage at one or more points in the battery protection circuit and to diagnose whether any one of the first switch and the second switch is damaged,
wherein a source terminal of the first switch and a source terminal of the second switch are connected to a common source,
wherein the one or more points in the battery protection circuit include:
a first point between the battery pack and a drain terminal of the first switch;
a second point between a drain terminal of the second switch and a load; and
a third point at which the source terminal of the first switch and the source terminal of the second switch are connected to the common source, and
wherein the switch damage diagnosing device is configured to determine that the first switch and the second switch are normally operating, when a voltage at the first point and a voltage at the second point are each concurrently greater than or equal to a threshold value and the voltage at the third point is less than or equal to the threshold value.

2. The apparatus of claim 1, wherein the first switch is a discharge control transistor configured to control a discharge circuit when discharging the battery pack, and
wherein the second switch is a charge control transistor configured to control a charge circuit when charging the battery pack.

3. The apparatus of claim 1, wherein the drain terminal of the first switch in the battery protection circuit is connected to a positive electrode of the battery pack and the drain terminal of the second switch in the battery protection circuit is connected to the load.

4. The apparatus of claim 3, wherein the battery protection circuit further includes a voltage applying circuit,
wherein a first end of the voltage applying circuit is connected to the first point between the battery pack and the drain terminal of the first switch, and a second end of the voltage applying circuit is connected to the second point between the drain terminal of the second switch and the load, and
wherein the voltage applying circuit is configured to bypass the first switch and the second switch to apply a voltage of the battery pack to the second point.

5. The apparatus of claim 4, wherein the voltage applying circuit comprises a P-channel switching circuit.

6. A method for diagnosing damage of a switch in a battery protection circuit including a first switch and a second switch connected to a battery pack, the method comprising:
measuring a voltage at one or more points in the battery protection circuit; and
comparing the voltage with a threshold value to diagnose whether any one of the first switch and the second switch is damaged,
wherein a source terminal of the first switch and a source terminal of the second switch are connected to a common source,
wherein the measuring the voltage at the one or more points in the battery protection circuit includes:
measuring a voltage at a first point between the battery pack and a drain terminal of the first switch;
measuring a voltage at a second point between a drain terminal of the second switch and a load; and
measuring a voltage at a third point at which the source terminal of the first switch and the source terminal of the second switch are connected to the common source, and
wherein the comparing the voltage with the threshold to diagnose whether any one of the first switch and the second switch is damaged includes determining that the first switch and the second switch are normally operating when the voltage at the first point and the voltage at the second point are each concurrently greater than or equal to the threshold value and the voltage at the third point is less than or equal to the threshold value.

7. The method of claim 6, wherein the first switch is a discharge control transistor configured to control a discharge circuit when discharging the battery pack, and
wherein the second switch is a charge control transistor configured to control a charge circuit when charging the battery pack.

8. The method of claim 6, wherein the battery protection circuit further includes a voltage applying circuit,
wherein a first end of the voltage applying circuit is connected to the first point between the battery pack and the drain terminal of the first switch, and a second end of the voltage applying circuit is connected to the second point between the drain terminal of the second switch and the load, and
wherein the voltage applying circuit bypasses the first switch and the second switch to apply a voltage of the battery pack to the second point.

9. The method of claim 8, wherein the voltage applying circuit comprises a P-channel switching circuit.

10. The method of claim 8, wherein the first switch and the second switch are high side type power transistors positioned closer to the battery pack relative to the load.

11. An apparatus for diagnosing damage of a switch in a battery protection circuit including a first switch and a second switch connected to a battery pack, the apparatus comprising:
at least one processor; and
a memory configured to store at least one instruction executed by the at least one processor,
wherein the at least one instruction includes:
an instruction to measure a voltage at one or more points in the battery protection circuit; and
an instruction to compare the voltage with a threshold value to diagnose whether any one of the first switch and the second switch is damaged,
wherein a source terminal of the first switch and a source terminal of the second switch are connected to a common source,
wherein the instruction to measure the voltage at the one or more points in the battery protection circuit includes:
an instruction to measure a voltage at a first point between the battery pack and a drain terminal of the first switch;
an instruction to measure a voltage at a second point between a drain terminal of the second switch and a load; and
an instruction to measure a voltage at a third point which the source terminal of the first switch and the source terminal of the second switch are connected to the common source, and
wherein the instruction to compare the voltage with the threshold value to diagnose whether any one of the first switch and the second switch is damaged includes an instruction to determine that the first switch and the second switch are normally operating, when the voltage at the first point and the voltage at the second point are each concurrently greater than or equal to the threshold value and the voltage at the third point is less than or equal to the threshold value.

12. The apparatus of claim 11, wherein the first switch is a discharge control transistor configured to control a discharge circuit when discharging the battery pack, and
wherein the second switch is a charge control transistor configured to control a charge circuit when charging the battery pack.

13. The apparatus of claim 11, wherein the battery protection circuit further includes a voltage applying circuit,
wherein a first end of the voltage applying circuit is connected to the first point between the battery pack and the drain terminal of the first switch, and a second end of the voltage applying circuit is connected to the second point between the drain terminal of the second switch and the load, and
wherein the voltage applying circuit is configured to bypass the first switch and the second switch to apply a voltage of the battery pack to the second point.

14. The apparatus of claim 13, wherein the voltage applying circuit comprises a P-channel switching circuit.

15. The apparatus of claim 13, wherein the first switch and the second switch are high side type power transistors positioned closer to the battery pack relative to the load.

\* \* \* \* \*